__United States Patent__ [19]

Kinjo et al.

[11] 4,315,283

[45] Feb. 9, 1982

[54] HIGH DENSITY RECORDING SYSTEM USING SIDE-BY-SIDE INFORMATION AND SERVO TRACKS

[75] Inventors: Hisao Kinjo; Keiji Ozawa, both of Yokohama, Japan

[73] Assignee: Victor Company of Japan, Ltd., Yokohama, Japan

[21] Appl. No.: 33,324

[22] Filed: Apr. 25, 1979

Related U.S. Application Data

[63] Continuation-in-part of Ser. No. 785,095, Apr. 6, 1977.

[30] Foreign Application Priority Data

Apr. 8, 1976 [JP] Japan ............................ 51-38809
Oct. 26, 1976 [JP] Japan ............................ 51-127767

[51] Int. Cl.$^3$ ................. H04N 5/76; G11B 11/12
[52] U.S. Cl. ....................... 358/128.6; 369/13; 369/44; 369/111
[58] Field of Search ............ 346/76 L, 108; 358/127, 358/128.5, 128.6, 129-132, 4-8; 179/100.1 G, 100.1 B, 100.3 R, 100.3 B, 100.3 D, 100.3 V, 100.4 C, 100.4 D; 360/27, 33, 35, 70, 77, 10; 365/120, 124, 234; 369/43-44, 126, 111, 13

[56] References Cited

U.S. PATENT DOCUMENTS

| | | | |
|---|---|---|---|
| 3,263,031 | 7/1966 | Welsh | 360/77 |
| 3,438,050 | 4/1969 | Aschenbrenner et al. | 346/76 L |
| 3,479,664 | 11/1969 | Stuart-Williams et al. | 360/77 |
| 3,593,331 | 7/1971 | Connell | 360/77 |
| 3,624,284 | 11/1971 | Russell | 179/100.3 V |
| 3,673,412 | 6/1972 | Olson | 250/201 |
| 3,829,892 | 8/1974 | Naguhiro et al. | 360/27 |
| 3,864,740 | 2/1975 | Sordello et al. | 360/27 |
| 3,919,697 | 6/1974 | Walker | 365/120 |
| 4,123,788 | 10/1978 | Kruger | 360/77 |

OTHER PUBLICATIONS

Matla et al., "Track Servo System Compensating Pattern Defects", pp. 3269-3270, IBM Tech. Disc., Bulletin, vol. 22, No. 8A, 1/80.
Tsilibes, "Transducer Position Sensor", 10/61, pp. 24-25, IBM Tech. Disc. Bulletin, vol. 4, No. 5.
Bush et al., "Magnetic Head Position Sensing", 10/73, pp. 1379-1380, IBM Tech. Disc. Bulletin, vol. 16, No. 5.

Primary Examiner—Raymond F. Cardillo, Jr.

[57] ABSTRACT

An information signal recording system records an information signal, a first and a second reference signals for tracking control, and a third reference signal for switching the first and second reference signals at the time of reproduction on a recording disc. The first and second reference signals are alternately recorded at positions intermediate between centerlines of adjacent information signal tracks. The third reference signal is recorded at a predetermined position on every information signal track. A reproducing system reproduces the information signal together with the third reference, and the first and second reference signals by a single reproducing element. A tracking control signal is produced from the first and second reference signals switched by the third reference signal separated from the reproduced information signal.

2 Claims, 33 Drawing Figures

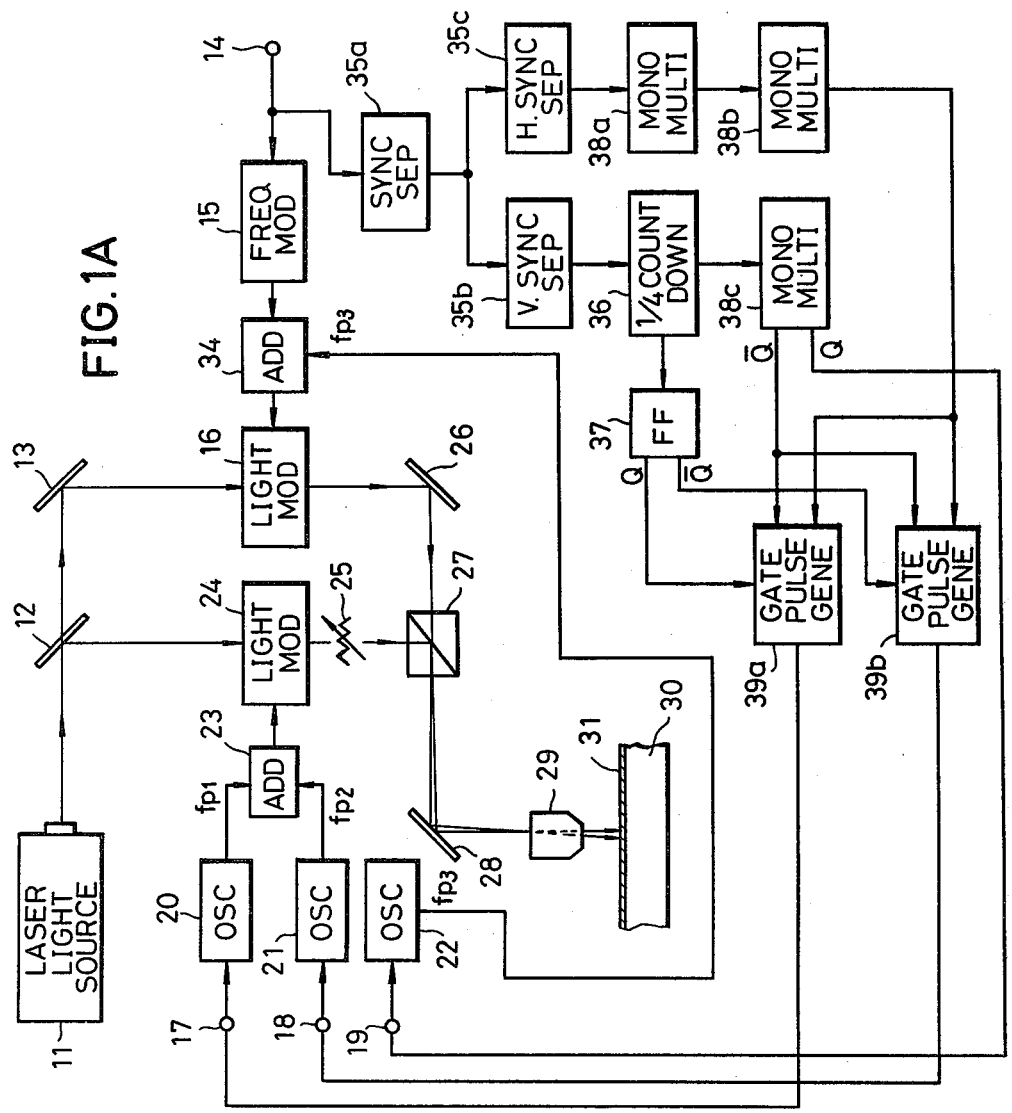

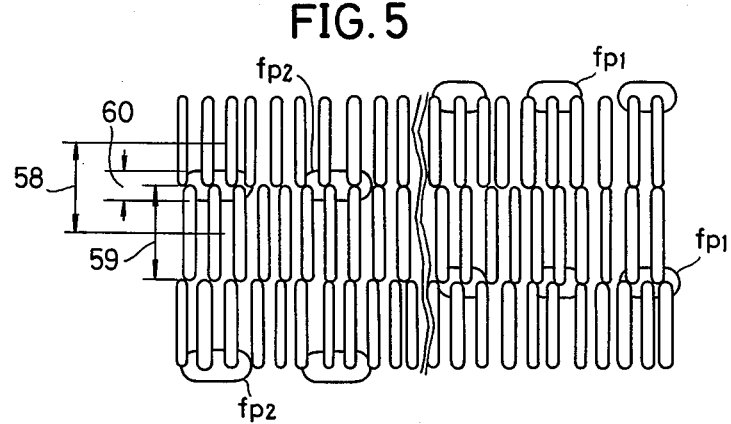
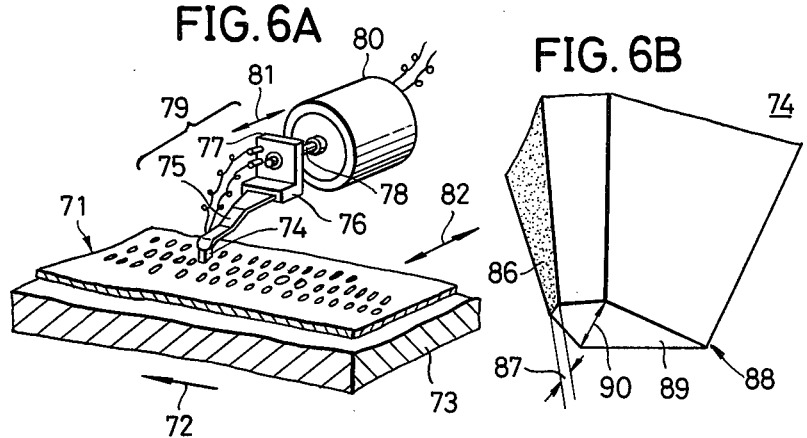
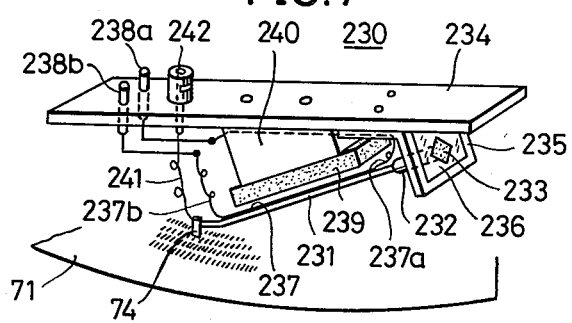

HIGH DENSITY RECORDING SYSTEM USING SIDE-BY-SIDE INFORMATION AND SERVO TRACKS

BACKGROUND OF THE INVENTION

This application is a continuation-in-part application of copending U.S. patent application Ser. No. 785,095, "INFORMATION SIGNAL RECORDING SYSTEM" filed Apr. 6, 1977.

The present invention relates generally to systems for recording and reproducing information signals on and from recording mediums, and more particularly to a system for recording an information signal with high density and, moreover, for recording a reference signal for providing tracking control at specific positions on a recording medium and reproducing the same.

A laser beam is used in one example of a system for recording and reproducing an information signal with high density. A video signal and/or an audio signal are recorded on and reproduced from a recording medium. In this system, a laser beam is used to record and reproduce the information signal optically on and from a rotating recording medium. In the reproducing portion of this system, it is necessary to exercise tracking control so that the reproduction laser beam will accurately trace the track recorded on the rotating recording medium.

One known example of a system for accomplishing this tracking control uses a light beam obtained by dividing a light beam normally used for reproducing after it is reflected from the recording medium. The divided beam is used for tracking control. Another known tracking control system uses a reproducing light beam which is divided into one main light beam for reproducing and two subsidiary light beams for tracking. The tracking control is achieved by these subsidiary light beams.

All of these known tracking control systems, however, have required complicated and expensive apparatus, have produced unstable operation, and have been incapable of accomplishing positive and accurate tracking control.

Accordingly, a possible system for solving these problems accompanying known tracking control systems would appear to use a single laser beam system. The beam records a main information signal and is deflected at a specific part on the main information track. The deflected beam records a tracking signal on this specific part. In this system, however, at least the main information signal is disturbed or interrupted by the deflection. Consequently, a continuously reproduced signal of high quality cannot be obtained. Furthermore, means for compensating for the interrupted signal is necessary. The reproducing apparatus becomes complicated and expensive.

Another example of a system for recording and reproducing information signals is a system which records and reproduces an information signal as a variation of electrostatic capacitance or as a variation of mechanical vibration. A rotating recording medium reproduced by these systems has a spiral guide groove formed thereon, for guiding a tracing stylus used for reproducing a signal. Along the bottom part of this guide groove, there is formed a track of an information signal which is recorded as a variation of a geometrical configuration. The tracing stylus is guided by this guide groove while tracing the bottom thereof and thus reproduces the recorded information signal.

However, a recording and reproducing system of this known type has been accompanied by various problems as enumerated below.

(a) If a tracing stylus is compulsorily guided by the guide groove, it is theoretically impossible to have special modes of reproduction such as still motion, slow-motion, intermittent frame-by-frame, high-speed searching for a reproduction start point, and information search, etc.

(b) If a video signal is to be recorded as an information signal, the groove pitch on the recording medium unavoidably must be made less than a number of $\mu$m, because the frequency band of a video signal is wide and is recorded with high density. As a consequence, the area of the contact with the recording medium and the shape of the tracing stylus are limited by the groove pitch dimension. For this reason, there is a large contacting force per unit area at the contacting parts between the tracing stylus and the recording medium. As a consequence, the serviceable life of the tracing stylus and of the groove on the recording medium are very short.

(c) The stylus jumps if the stylus pressure is reduced in order to suppress abrasive wear of the tracing stylus. The stylus pressing force has been reduced to a minute value of 30 mgr., for example, with a resultant jumping of the stylus.

(d) As the abrasive wear of the tracing stylus progresses, it becomes increasingly easy for the tracing stylus to vibrate within the guide groove. Under this condition, the reproducing operation becomes unstable. Furthermore, the wear of the tracing stylus is promoted. This vibration phenomenon is attributable to the sticking and slipping of the tracing stylus which occur within the guide groove at the time when the tracing stylus is being compulsorily guided by the guide groove.

(e) When the tracing stylus vibrates, a great pressure is applied locally in a concentrated manner on the side walls of the guide groove. The film on the groove side wall surface is scraped off. Particularly, severe scraping occurs at the outer peripheral part of a rotating recording medium where the relative velocity of the tracing stylus and the recording medium is large. It is observed that the scraping of the guide groove wall surfaces are converted into the state of fish scales.

(f) As another consequence of the above described abrasive scraping, fine pieces of scraped off film adhere to the tracing stylus and give rise to frequent interruptions or skipping and deterioration of the reproduced signal. As a result of observation and an analysis of the foreign matter adhering to the tracing stylus under these circumstances, it was discovered that the foreign matter comprised the dielectric material covering the recording disc surface and the underlying metal film material. In some cases, it was found that the foreign matter further contained polyvinyl chloride (PVC), which is the material of the recording disc. This finding verifies that the foreign matter deposited on the tracing stylus is not a substance which has infiltrated from the outside, but comprises almost entirely materials scraped off from the recording disc.

(g) The tracing stylus and the guide groove are very fine and intricate in shape, and therefore are difficult to make.

(h) Since the signal groove has been formed on the recording disc, the process of recording the information signal on the original disc is laborious and complicated.

Accordingly, in order to overcome the various above described problems which arise from the guide groove, the invention sets forth the recording of an information signal as a variation of a geometrical form on a rotating recording medium, without providing a guide groove.

However, since there is no groove for compulsorily guiding the tracing stylus, it is necessary to provide means for causing the tracing stylus to trace positively and accurately over the recorded track. Accordingly, the invention provides a tracking control of the tracing stylus so that it will trace accurately and positively over the recorded track. The invention has made it possible to record and reproduce signals in a system which does not have a guide groove, as described above.

SUMMARY OF THE INVENTION

Accordingly, it is a general object of the present invention to provide a novel and useful system for recording and reproducing information signals in which the above described problems have been solved.

Another object of the invention is to provide a recording system in which one or the other of first and second reference signals for tracking control is recorded on a reference signal track on an intermediate part between center lines of adjacent information signal tracks, said first and second reference being recorded on the reference signal tracks alternately in a radial direction of a recording disc, and a third reference signal for switching the first and second reference signals reproduced in a reproducing system is recorded at a predetermined position on the information signal track.

A further object of the present invention is to provide a reproducing system in which the information signal and the first, second, and third reference signals recorded by the above described recording system are reproduced simultaneously by a single reproducing tracing means, and the first and second reference signals are switched responsive to the third reference signal to thereby produce a tracking control signal. In the system according to the invention, since the third reference signal is recorded on the information signal track, the reproducing tracing means can reproduce always accurately the third reference signal, even though the reproducing tracing means deviates slightly from the center line of the information signal track, whereby the tracking control signal is always accurately produced from the first and second reference signals switched responsive to the third reference signal.

Further objects and features of the present invention will be apparent from the following detailed description when read in conjunction with accompanying drawings.

BRIEF DESCRIPTION OF THE DRAWINGS

In the drawings:

FIG. 1A is a block diagram showing a first embodiment of a recording system according to the present invention;

FIG. 5 is an enlarged view of a second embodiment of a track pattern recorded and formed in accordance with the present invention;

FIGS. 6A and 6B are respectively a perspective view showing one embodiment of a reproducing tracing means which is usable in the system of the present invention, and an enlarged perspective view, as viewed from the bottom, showing a tip portion of the tracing stylus;

FIG. 7 is a perspective view showing another embodiment of the reproducing tracing means;

DETAILED DESCRIPTION

Figure 1B:
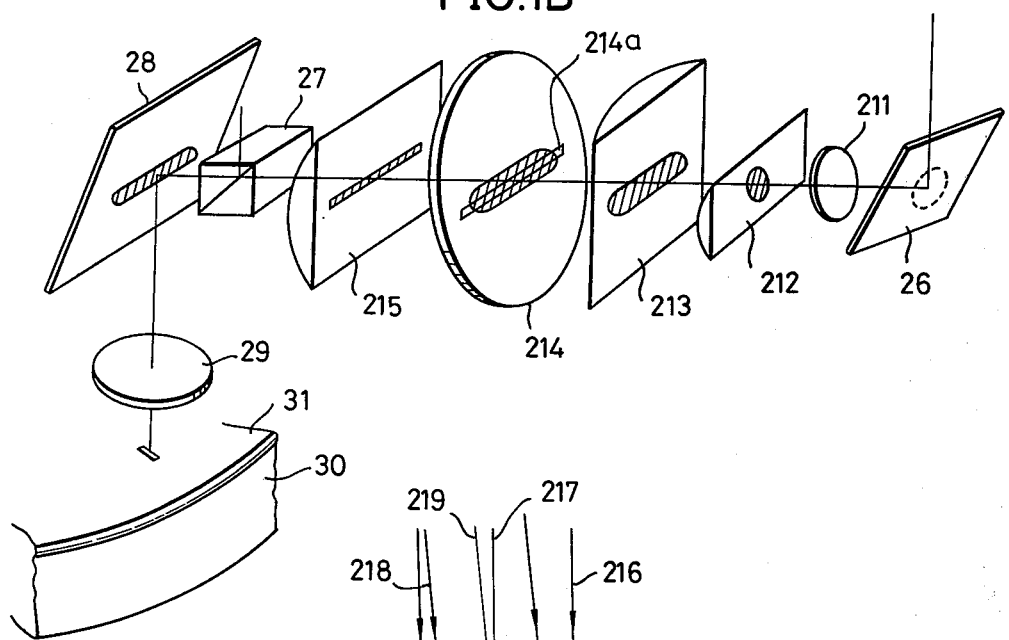
FIG. 1B is a schematic disclosure, in perspective, of a lens system for recording signals responsive to light beams.

A first embodiment of a recording system, according to the present invention, is described with reference to FIG. 1A through FIG. 3.

Referring to FIG. 1A, a part of a laser beam projected from a laser light source 11 is reflected, by a half-mirror 12, to a light beam modulator 24. The remaining part of the projected laser beam passes through the half-mirror 12 and is reflected by a reflecting mirror 13 to a light beam modulator 16. A recording information signal including a color video signal and an audio signal is introduced through an input terminal 14 and is supplied as a main information signal to a frequency modulator 15 where it frequency-modulates a carrier. The output frequency modulated signal is applied, through an adder 34, to the light beam modulator 16 where it modulates the laser beam. The above color video signal is indicated in FIG. 2(A) with a unit of a vertical synchronizing pulse 40, and in FIG. 2(C) with a unit of the horizontal synchronizing pulse 41.

The light beam modulator 16 modulates a first light beam responsive to a frequency modulating signal. The modulated beam is reflected by a mirror 26 through a lens 211, and cylindrical lenses 212 and 213 to form a light beam having an elliptic cross section, as shown in FIG. 1B. This light beam passes through a slit 214a of a mask 214 to be formed in a thin light beam. Then, the beam passes further through a cylindrical lens 215 and a polarization prism 27, a reflecting mirror 28 and an objective lens 29. The light beam passed through the lens 29 is focused in such a manner that a focal point of the lens 29 coincides with a sensitive material 31 coated on an original recording disc 30 made of material such as glass.

Switching pulses are applied to oscillators 20, 21 and 22 through input terminals 17, 18, and 19, respectively. The switching pulses cause, for instance, the oscillators 20, 21 and 22 to have an output during the interval of positive pulse polarity, and to have no output during the interval of negative pulse polarity. The oscillators 20, 21, and 22 oscillate at their original frequencies and generate signals having, respectively, single frequencies fp1 (e.g., 700 KHz) fp2 (e.g., 500 KHz), and fp3 (e.g., 300 KHz).

When every two-frame video signal is to be recorded on the disc 30 per rotation thereof, for instance, first and second pulses are used alternatively during every two-frame interval. These are input switching pulses which are supplied to the input terminals 17 and 18.

On the other hand, the video signal applied to the input terminal 14 is supplied to a synchronizing signal separation circuit 35a where a synchronizing signal is separated from the video signal. The separated synchronizing signal is supplied to a vertical synchronizing signal separation circuit 35b and a horizontal synchronizing signal separation circuit 35c. A vertical synchronizing signal 40 (FIG. 2(A)) is separated from the input video signal by the synchronizing signal separation circuits 35a and 35b, and supplied to a ¼ count-down circuit 36. Pulses shown in FIG. 2(B) having a four fields (two frames) period are obtained from the circuit 36. The resulting output of the circuit 36 is counted down by ½ at a flip-flop circuit 37 having outputs Q and $\overline{Q}$, which are connected to gate pulse generators 39a and 39b. The output of the ¼ count-down circuit 36 also triggers a mono-multivibrator 38c. The output $\overline{Q}$ of the mono-multivibrator 38c is supplied to the gate pulse generators 39a and 39b.

FIG. 2(C) includes a part of the video signal shown in FIG. 2(A), in an enlarged time-axis scale. A horizontal synchronizing signal 41 has a period corresponding to 1H (one horizontal scanning period is designated by $\underline{H}$). The signal 41 is separated from the input video signal shown in FIG. 2(C) by the synchronizing separation circuits 35a and 35c and used to trigger mono-multivibrators 38a and 38b in sequence. The output of the mono-multivibrator 38b is supplied to the gate pulse generators 39a and 39b which form pulses having pulse widths which are synchronized in phase with the horizontal blanking period (abbreviated "H. BLK" hereinafter) of the color video signal which is to be recorded. These gate pulses are alternatively derived in two frame periods and applied to the input terminals 17 and 18, to gate the output of the oscillators 20 and 21.

The output Q has a signal every two frame periods of the mono-multivibrator 38c and is connected directly to the input terminal 19 to gate the output of the oscillator 22. The pulse width is selected so that a reference signal for tracking control does not affect a color burst signal 42 indicated in FIG. 2(C). Consequently, the signal fp1 is sent from the oscillator 20 for a two-frame interval (1/15 second), in a time-phase relationship as indicated in FIGS. 2(C) and 2(D), respectively. Following this, the signal fp2 is sent from the oscillator 21 for the following two-frame interval, in the time-phase relationship, as indicated in FIGS. 2(C) and 2(D), respectively. The signals fp1 and fp2 are thereafter sent every two-frame period, successively and alternately.

In correspondence to the time point when the signals fp1 and fp2 switch a third reference signal fp3 is sent out from oscillator 22. This signal fp3 is an index pulse at the time of reproduction.

The invention may be used to carry out a special reproduction such as still-motion or slow-motion. It is particularly useful if the information signal is principally a video signal. A kick-back control is required for shifting or forcibly transferring a reproducing tracing means tracing one track, to another track within a vertical blanking period (abbreviated as V. BLK hereinafter). For this kick-back control operation, the signal fp3 is recorded at the V. BLK part of the video signal. FIG. 3(A) shows the V. BLK part of the video signal. The pulses, designated by 45a in FIG. 3(A), may be recorded as the signal fp3 during two or three $\underline{H}$ periods at the initial horizontal synchronizing pulse part following equalizing pulses, projecting toward the white side. When the tracing stylus is actually kicked back by the signal fp3, at the time of still-motion reproduction or slow motion reproduction, the tracing stylus is not stabilized on a predetermined track immediately after jumping. Rather, the tracing stylus hunts to some extent. Interrelatedly with a response characteristic of the mechanism for moving the tracing stylus, some noise may appear on the upper part of the picture responsive to the kick-back operation. Therefore, in order to kick back completely within the V.BLK interval, the switching operation is carried out at the time of signal recording and reproduction either just before or just after the respective ends of the video signal intervals. In this case, the signal fp3 is inserted and recorded at a position designated 45b in FIG. 3(A), with respect to the recording video signal.

The third reference signal fp3 from the oscillator 22 is supplied to the above described adder 34 where it is added to the main information signal from the frequency modulator 15. Accordingly, the reference signal fp3 is recorded on the information signal track, as described hereinafter.

Timing relation in time base between an output signal of the adder 23 and an output signal of the oscillator 22 is indicated in FIG. 3(C) or FIG. 3(D). FIG. 3(C) indicates a waveform wherein the signal fp3 is recorded at a switching timing position of the signal fp1 and the signal fp2. Signal fp3 is an intermittent oscillation pulse extending over two or three H periods of time. FIG. 3(D) indicates a waveform where the signal fp3 is recorded continuously for a somewhat wider predetermined period of time.

FIG. 3(B) indicates an H period pulse (a reference pulse for controlling the rotation of the recording disc 30 with accuracy) synchronized in phase with the video signal to be recorded. The interval designated by numeral 46 corresponds to the V. BLK period of the video signal. The H period pulse has relationships with the phases of the reference signals fp1 and fp2, as indicated in FIGS. 3(B), 3(C), and 3(D), respectively.

As a modification, the signals fp1 and fp2 may be inserted or removed successively and alternately even in the part where the signal fp3 has been inserted. Further, even if the signals fp1 and fp2 are dropped out for three or four H periods by recording the signal fp3, there are no deleterious effects in the tracking servo operation.

The output signal of the adder 23 is applied, as a modulation signal, to the light beam modulator 24. The second modulated output light beam from the light beam modulator 24 is attenuated by a light filter 25. The brightness (beam light quantity) is adjusted to be attenuated appropriately in comparison with the quantity of light of the first modulated light beam. The attenuated second modulated light beam thereafter advances to a polarization prism 27, where the polarization plane of the light beam is deviated by 90° with respect to the polarization plane of the first modulated light beam.

Figure 1C:
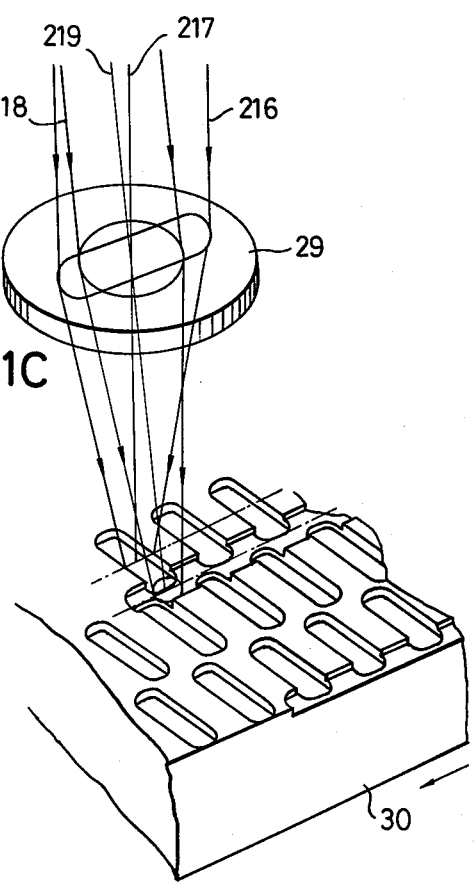
FIG. 1C is a perspective view of an objective lens and light beams passing therethrough.
Figure 2:
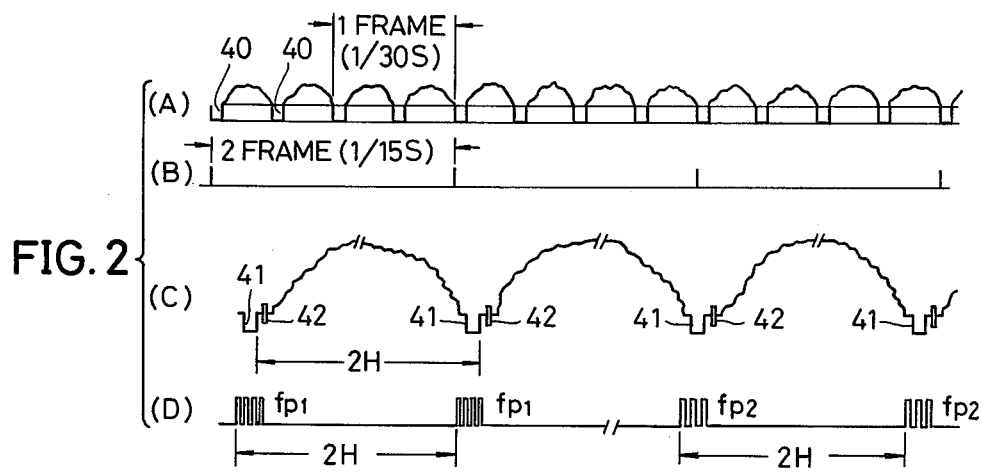
FIG. 2(A) through FIG. 2(D) and FIG. 3(A) through FIG. 3(D) are signal waveform diagrams respectively for explaining the operation of the system in the block diagram shown in FIG. 1A.
Figure 3:
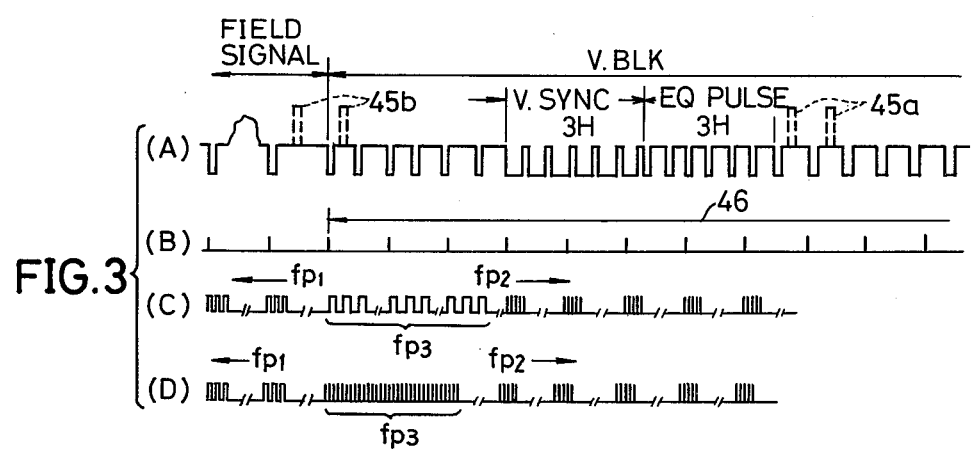

The second modulated light beam which has passed through the polarization prism 27, together with the first modulated light beam, is reflected by the reflecting mirror 28 and passes through the objective lens 24. Then the beams irradiate the sensitive material 31 on the rotating recording disc. 30. The polarization prism 27 adjusts the incident light path of the second modulated light beam toward the objective lens 29, with respect to the first modulated light beam. Accordingly, as shown in FIG. 1C, a light axis 219 of the second modulated light beam 218 passing through the objective lens 29 is deviated from a light axis 217 of the first modulated light beam 216.

The light beam transmitted through the above described optical system and onto the sensitive material 31 of the rotating recording disc 30 is exposed in the radial direction and formed at a predetermined pitch. After this exposure, the sensitive material is developed. The spiral track, for instance, is formed as a change of the geometrical configuration, such as the formation of pits in accordance with the exposure (FIG. 1C). Pits are not directly formed by only an exposure of the light beam on the light sensitive material 31. However, for convenience of illustration, light beams and pits are illustrated together in FIG. 1C. As a result of this adjustment, the second modulated light beam records and forms a sub-track, which is separated by approximately a ½ track pitch from a main track formed by the first modulated light beam. Here, the track pitch refers to a distance between two tracing center lines of adjacent tracks. Further, in the above described recording system, a guide groove for guiding the reproducing tracing stylus is not formed, not even for a disc adapted to be used in the reproducing system wherein a tracing stylus is used as a reproducing tracing means.

Figure 4A:
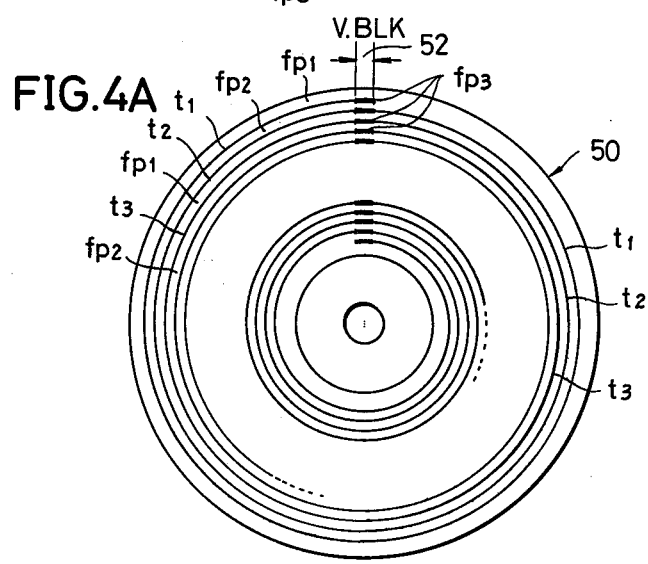
FIG. 4A through FIG. 4D are successively enlarged views showing a portion of a track pattern of a first embodiment recorded and formed on a rotating record medium in accordance with a system of the present invention.
Figures 4B, 4C, 4D:
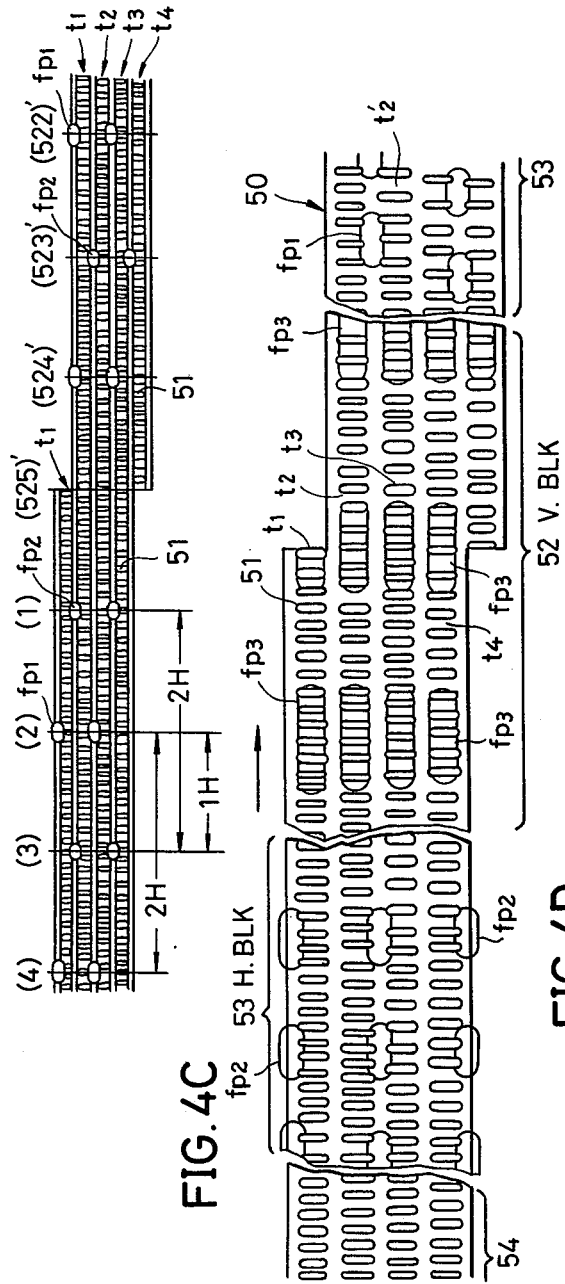

A track pattern recorded on the disc by the system in FIG. 1 is as indicated in FIG. 4A through FIG. 4D, for instance. The signal fp3 is recorded in alignment in the radial direction of the disc 50, as indicated in FIG. 4A. FIG. 4B schematically shows the first embodiment of the track pattern which circles the disc indicated in FIG. 4A, for convenience of description. A track pattern indicated in FIG. 4C is a magnification of part of the track pattern in FIG. 4B. In FIG. 4B, numerals (1), (2), (3), . . . respectively indicate parts where the first, the second, the third . . . horizontal synchronizing signals of the first frame of the video signal are recorded. Numerals (521)′, (522)′, . . . (525)′ respectively indicate parts where the 521st, the 522nd, . . . the 525th horizontal synchronizing signals of the second frame of the video signal are recorded. That is, in the present embodiment, two frames of the video signal having 525 horizontal scanning lines per one frame are recorded for every rotation of the disc.

In FIG. 4C, reference marks t1, t2, t3, . . . respectively designate the first, the second, the third . . . main tracks which are recorded and formed, one track during every rotation of the disc 50. The recording is made by forming a number of intermittent pits 50. The reference signals fp1 and fp2 are recorded alternately with a period of one rotation between them. The reference signals are formed by intermittent pits located between the adjacent main tracks. The pits are shallow in comparison with the depth of the pits of the main track. Further, although the illustration is omitted in FIG. 4B for the sake of simplification, the reference signal fp3 is recorded as a timing pulse at a position 52 where the recording of the signals fp1 and fp2 is switched, in the vertical blanking interval V. BLK on the video signal track, as indicated in FIG. 4C. The switched position corresponds to a position (525)′ in FIG. 4B.

The signals fp1 and fp2 are recorded in only the horizontal blanking interval H. BLK shown by numeral 53 in FIG. 4C, but may be recorded along the entire track other than this interval.

Further, to record and reproduce the signals fp1 and fp2 with higher sensitivity, the present embodiment is arranged so that the positions of the signals fp1 and fp2 are respectively alternately recorded separately along every track. These signals are located at positions in the H. BLK period with a period of 2H interval. Furthermore, the recording of the signals fp1 and fp2 is such that the recording positions of the signals fp1 and fp2 are located within the H. BLK period at positions which are separated or deviated by every 1H interval alternately with respect to the adjacent tracks. According to this arrangement, the signals fp1 and fp2 are recorded without affecting the main information signal. Further, the reference signals can be recorded with a wider dimension even when the main information signal is recorded with very small track pitch, i.e., with high density. The reference signals can be reproduced in a stable manner, thereby stabilizing the tracking control operation. However, the signals fp1 and fp2 may be recorded at positions corresponding to every H. BLK of the video signal. Further, by using a single low frequency, the reference signal can be reproduced in a stable manner. This low frequency has a longer wavelength as compared to the reference signals described hereinbefore.

FIG. 4D indicates a part of the track pattern indicated in FIG. 4B, with further enlargement. The track pattern is formed by recording a main track with track pitch 58 (e.g., 2.8 μm), pit width 55 (e.g., 2.6 μm), and a sub-track with pit width 56 (e.g., 1.2 μm) at an intermediate position between the adjacent main tracks, with overlap on the main track at parts 57, 57′.

FIG. 5 is an enlarged plan view showing a part of a track pattern of a second embodiment. The track pattern is formed by recording the main track with a track pitch 58 of 2.8 μm, which is the same as that of the main tracks in FIG. 4D. The track position coincides with the pit width 59 without any vacant space between the adjacent main tracks. Also the sub-track is recorded with a pit width 60 of 1.0 μm, for instance, at the intermediate part between the center lines of adjacent main tracks so as to entirely overlap on the main track. The track pattern set forth is more effective for increasing or improving the signal reproducing sensitivity and the recording density of the information track.

Furthermore, as shown in FIGS. 4B, 4C, 4D, and 5, it is desirable for the pits of the signals fp1 and fp2 to be formed at the intermediate parts of the main information signal pits. Moreover, the pits of fp1 and fp2 partially overlap parts with respect to the pits on both of their sides. Even when recording is carried out in this manner, the above mentioned reference signal has no deleterious effect.

As is known in this connection, the horizontal scanning frequency of a television video signal of the NTSC system is 15.75 KHz. Since the rotational speed of the disc 50 in this embodiment is 900 rpm, the fundamental error period at the time of disc eccentricity is merely 15 Hz. This period is ample to provide the information tracking control.

FIG. 6A shows one embodiment of the reproducing tracing means suitable for use in the inventive reproducing system. A disc-shaped recording medium (disc) 71 has on its surface a thin metal film coating. On this disc surface, pits of the main information signal and reference signals fp1 and fp2 are respectively recorded on opposite lateral sides, as shown in FIGS. 4 and 5. The disc 71 is positioned on and rotates with a turntable 73 rotated synchronously by a disc motor (not shown) at, for example, 900 rpm. Turning is in the arrow direction 72 at the time of reproducing. A tracing stylus 74 is positioned to contact and slide over the disc 71. For example, a signal pickup may be an electrostatic capacitance type. A video signal of two frames is reproduced on every rotation of the disc 71.

The tracing stylus 74 has a tip shape as shown in FIG. 6B. The tracing stylus proper is made of a material such as diamond or sapphire. The entering or leading part 88 of this tracing stylus 74 is formed by the acute vertex of the sliding surface. An electrode 86 made of a metal such as titanium is secured to the back part of the stylus by a sputtering process. The width 87 of the electrode 86 corresponds substantially to the pit width, being approximately 2 $\mu$m. in the present embodiment. For preserving the serviceable life of the stylus over a long period, the area of the contacting and sliding part 89 of the stylus tip should be made large. For this purpose, the dimensions of the contact in the longitudinal and transverse directions are made large. The width and area of stylus contact with the disc surface should be large relative to the information pit. Accordingly, the sliding surface 89 makes simultaneous contact with a plurality of pits at the time of contact. The electrode width 87 corresponds to the information width of a single pit. Therefore, while the contact area is amply large, pit information can be picked up in the form of variations of the electrostatic capacitance. There is a high sensitivity from the electrode part 86.

The tracing stylus 74 is secured to a moving shaft 78 of a moving coil mechanism 80 by way of a thin leaf spring 75, a shock-absorbing member 76, and a bracket 77. The spring 75 and the shock-absorbing member 76 enable a stable contact between sliding tip of the tracing stylus 74 and the information surface on the disc 71, with a light pressing force of approximately 30 mg. Furthermore, the light up-and-down pressing force of the tracing stylus 74 is imparted to a signal pickup part 79, which is so constructed that it does not move in the left-and-right direction. The moving coil mechanism 80 is constructed similar to a loudspeaker and comprises a permanent magnet, a driving coil, and a yoke (not shown). The part is axially supported by a damper and is provided with the moving shaft 78. This moving shaft 78 is displaced in its radial direction, that is, in an arrow direction 81, which is the disc radial direction. Shaft 78 is displaced in response to the direction and magnitude of the electric current supplied to the above mentioned driving coil.

By this construction, the signal pickup structure 79 includes the tracing stylus 74 mounted on the moving shaft 78. The tracing stylus 74 is capable of high-speed control driving the tracing stylus 74 in the direction perpendicular to the signal track traced on the disc 71. Furthermore, the signal pickup structure 79 and the moving coil mechanism 80 are mounted on a traversing mechanism (not shown). They travel in a straight line and at a low speed synchronized with the rotational speed of the disc 71. Travel is in the radial direction 82 of the disc 71 at the time of signal recording or reproducing.

Another embodiment of a reproducing tracing means is illustrated in FIG. 7. In the reproducing tracing means 70, a cantilever 231 has a reproducing stylus 74 on its free end. Its proximal or clamped end is mounted on a magnet plate 233, via a damper 232. This magnet plate 233 is held by a thin rubber membrane 236 which provides a damping action. The membrane is secured to the bracket 235, fixed to the support plate 234, and functions as a damper. The magnet plate 233 operates cooperatively with a reproduction time axis compensation device of known type (not shown) which is driven by a control signal described hereinafter. The cantilever 231 and the tracing element 74 undergo a displacement in the longitudinal direction of the track, in response to the generation of jitter. As a result, there is an excellent correction of time-axis error in a reproduced signal. Or jitter correction can be accomplished without affecting the above described tracking control.

A very thin gold wire 237 is bonded to the cantilever 231 over a specific distance in the longitudinal direction thereof. Lead wires 237a and 237b are the end parts of this gold wire 237. These leads are respectively connected in a slackened state to terminals 238a and 238b, provided on the support plate 234. A permanent magnet 239 is on bracket 240 to which is attached the lower surface of the support plate 234. The wire 237 is thus disposed in a strong magnetic field formed by the magnet 239. An electrode of the tracing stylus 74 is connected to a terminal 242 through a lead wire 241.

The gold wire 237 which is disposed in the magnetic field of the magnet 239 is deviated together with the cantilever 231 on the Fleming's law responsive to the control signal applied between the terminals 238a and 238b, whereby the stylus 74 is controlled in its tracking to trace accurately on the track.

Next to be described is a first embodiment (FIGS. 8 and 9) of a reproducing system, according to the present invention.

Figure 8:
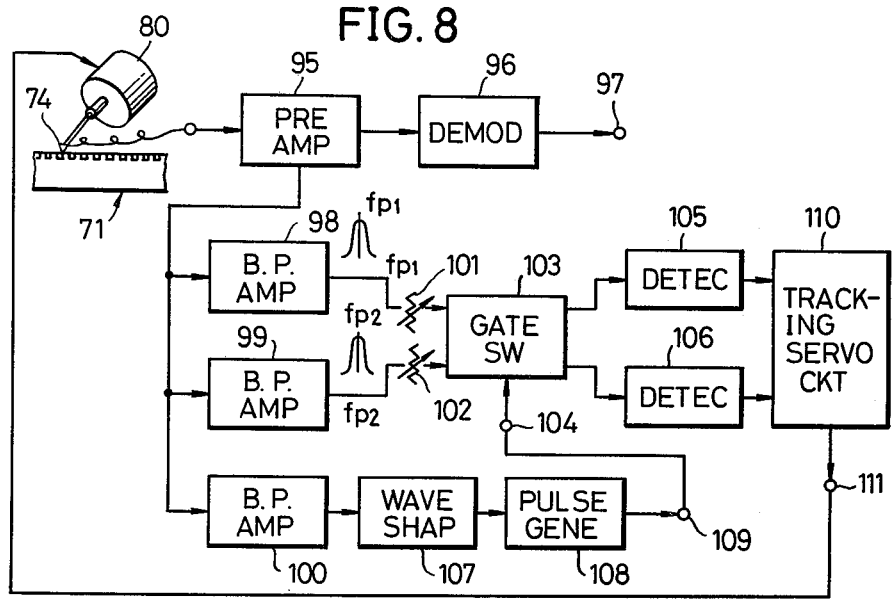
FIG. 8 is a block diagram showing a first embodiment of a reproducing system according to the present invention.
Figure 9:
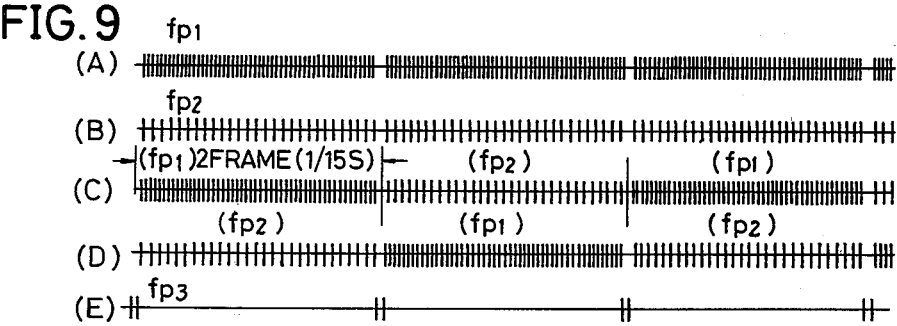
FIG. 9(A) through FIG. 9(E) are signal waveform diagrams for explaining the operation of the block diagram in FIG. 8.

In the system shown in FIG. 8, a reproduced signal picked up as a minute variation of electrostatic capacitance by the tracing stylus 74 from the disc 71 is supplied to a preamplifier 95 having a resonant circuit. The resonant frequency varies in response to this variation in electrostatic capacitance and is formed into a signal of a desired level. The resulting output of the preamplifier 95 is demodulated into the original information signal by a demodulator 96 and is sent out as an output through an output terminal 97.

The output signal of the preamplifier 95 is supplied respectively to amplifiers 98, 99, and 100. Here, each of the amplifiers 98 and 99 is a kind of band-pass amplifier. The amplifier 98 is designed to have a steep passing frequency characteristic at only the frequency fp1. The amplifier 99 is designed to have a steep passing frequency characteristic at only the frequency fp2. As a result, the signal of frequency fp1 is indicated in FIG. 9(A) and the signal of frequency fp2 as indicated in FIG. 9(B) are obtained separately from the amplifiers 98 and 99, respectively. These signals respectively pass through level adjusters 101 and 102, where their levels are adjusted. The resulting signals are then supplied to a gate switching circuit 103. These reproduced signals fp1 and fp2 are pulse trains respectively having periods corresponding to 2H (2 horizontal scanning periods). Moreover, they have a coinciding phase in the horizontal blanking period of the reproduced video signal. When this horizontal blanking period is approximately 11 microseconds, for example, and the frequencies fp1 and fp2 are set at 500 KHz and 300 KHz, respectively, the signals fp1 and fp2 become cyclic waveforms of approximately 5 cycles and 3 cycles, respectively.

If the recorded signal is a color video signal, and if there is a possibility of the recording and reproducing of the reference signals fp1 and fp2 affecting the color burst signal, it is desirable that the color burst signal position be avoided in the recording of the signals fp1 and fp2.

A switching pulse is generated in the position designated by reference numeral 52 in FIG. 4C and is supplied through an input terminal 104 to the gate switching circuit 103. (This position is the V. BLK part if the recorded main information signal is the video signal.) This switching pulse is a reference which switches the signals fp1 and fp2 every revolution period of the disc 71. The disc rotational speed in the present embodiment of the invention is 900 rpm. as mentioned hereinbefore. Therefore, two frames of the video signal are recorded for each revolution of the disc 71. The switching pulse applied to the input terminal 104 has inverting polarities which change every two frames (1/15 second). As a result, the gate switching circuit 103 supplies a signal as indicated in FIG. 9(C) and a signal as indicated in FIG. 9(D), respectively, to detecting circuits 105 and 106.

The band-pass amplifier 100 is designed to have a band-pass filter characteristic by which it separately filters only the signal of frequency fp3. As indicated in FIG. 9(E), the signal fp3 has been separated and amplified in this band-pass amplifier 100 and is supplied to a wave-form shaping circuit 107 consisting of a schmitt circuit, for example. There, its wave is shaped so that it is not affected by noise and other influences. The wave-shaped signal is then applied a pulse generating circuit 108. The resulting output of the pulse generating circuit 108 is sent out through an output terminal 109 and applied to the aforementioned input terminal 104 as a switching pulse.

The detecting circuits 105 and 106 detect the envelopes of their respective input reference signals and convert the envelopes into DC voltages. These voltages are then supplied to the input terminals of differential amplifiers (not shown) within a tracking servo circuit 110. This tracking servo circuit 110 compares the output signals of the two detecting circuits 105 and 106 which vary in response to the reproduced levels of the signals fp1 and fp2. This generates an output tracking error signal which indicates the tracking error direction and the error quantity. This error signal is further amplified to a specific level by known circuitry. Then, it is applied through an output terminal 111 to the moving coil mechanism 80 of the tracing stylus 74. Thus, the tracking of the tracing stylus 74 is stably controlled by the resulting closed loop.

In operation, the reproduction of the track t2 is to start, continuing from the recording position 52 of the signal fp3, upon completion of the reproduction of the track t1 of the tracing stylus 74, in FIG. 4B. In the present embodiment of the invention the reference pulse signal fp3 is extracted from the signal reproduced from the track t1. With this signal fp3 as reference, the polarities of the signals fp1 and fp2 are inverted at the reproduction of the track t2. The control direction by the signals fp1 and fp2 is inverted from that at the time of reproduction of the track t1, to control the moving coil mechanism 80. The reason for this is that the reference pulse signals fp1 and fp2 are recorded along the sides of the information track. The reference pulse signals are alternatively switched to opposite sides of each adjacent track, as is apparent from the explanation of the track pattern used in the recording system. For example, in the direction which the stylus traces along the track, the signal fp1 is formed on the right side of the track t1, while the signal fp2 is formed on the left side of the track t1, the signal fp1 is formed on the left side of the track t2, while the signal fp2 is formed on the right side of the track t2. For this reason, at the time of reproduction of the track t1, the tracing stylus is controlled in its tracking and moved toward the outer periphery of the disc 71 responsive to the reproduction of the signal fp1, and then moved toward the center of the disc by the reproduction of the signal fp2. Next, at the time of reproduction of the track t2, the reproduced signals fp1 and fp2 are switched responsive to the signal fp3, whereby the tracing stylus is controlled in its tracking and moved toward the outer periphery of the disc 71 responsive to the reproduction of the signal fp2, and then moved toward the center of the disc by the reproduction of the signal fp1. Therefore, this time, it is possible to trace accurately and positively in succession over the track t2.

The track t3 is reproduced upon completion of the tracing of the track t2, per revolution. By the inversion again of the polarities of the signals fp1 and fp2 at the recording position 52 of the signal fp3, tracing and tracking of the track t3 is similarly carried out. Similarly thereafter, the signal pickup structure 79 shown in FIG. 6A accurately and positively traces and reproduces the successive track paths, following one after another. The pickup successively moves, with a specific pitch, in the radial direction of the disc 71, for example, from the outer periphery toward the center of the disc. Thus, a normal reproduced picture is obtained.

Here, if a case where the signal fp3 is not exactly reproduced occurrs by any possibility, the switching operation of the signals fp1 and fp2 is not exactly performed at the gate switching circuit 103. In this case, it raises a serious accident where the direction of tracking control operation is reversed, whereby the tracing stylus is not controlled to trace on the center line of the track but controlled to deviate out from the track. However, in the present embodiment of the invention, the signal fp3 is exactly reproduced even though the tracing stylus deviates a little from the center line of the track, since the signal fp3 is recorded on the information signal track. Accordingly, there is no possibility to occur the above described serious accident.

The present invention reproduces a still motion picture by continuous reproduction of the same track and reproduces slow-motion pictures by repeated reproduction of each track. For example, upon completion of the first time reproduction of the track t1, a pulse is obtained responsive to the pulse signal fp3 which is detected from the signal recording position 52. This pulse signal has a compulsory power, with respect to the tracking servo circuit 110, and is applied from outside. A signal is applied from a tracking servo amplifier (not shown) to the moving coil mechanism 80. The tracing stylus is caused to jump or kick back at the position 52. In this manner, a continuous tracing of only the track t1 can be effected.

Furthermore, it is also possible by reducing to ⅓ the traversing speed of the signal pickup structure 79 in the disc radial direction. The above described operation is repeated three times for reproducing each of the succeeding tracks in a desired reproduced picture, for example. Interrelatedly with this, the switching pulses of the signals fp1 and fp2 are processed so that the same track will be reproduced three times each, and a 3:1 slow-motion picture is obtained. In addition, various operations such as high-speed searching, determination of the starting point of reproducing and forward-reverse reproduction can be carried out as desired.

Figure 10:
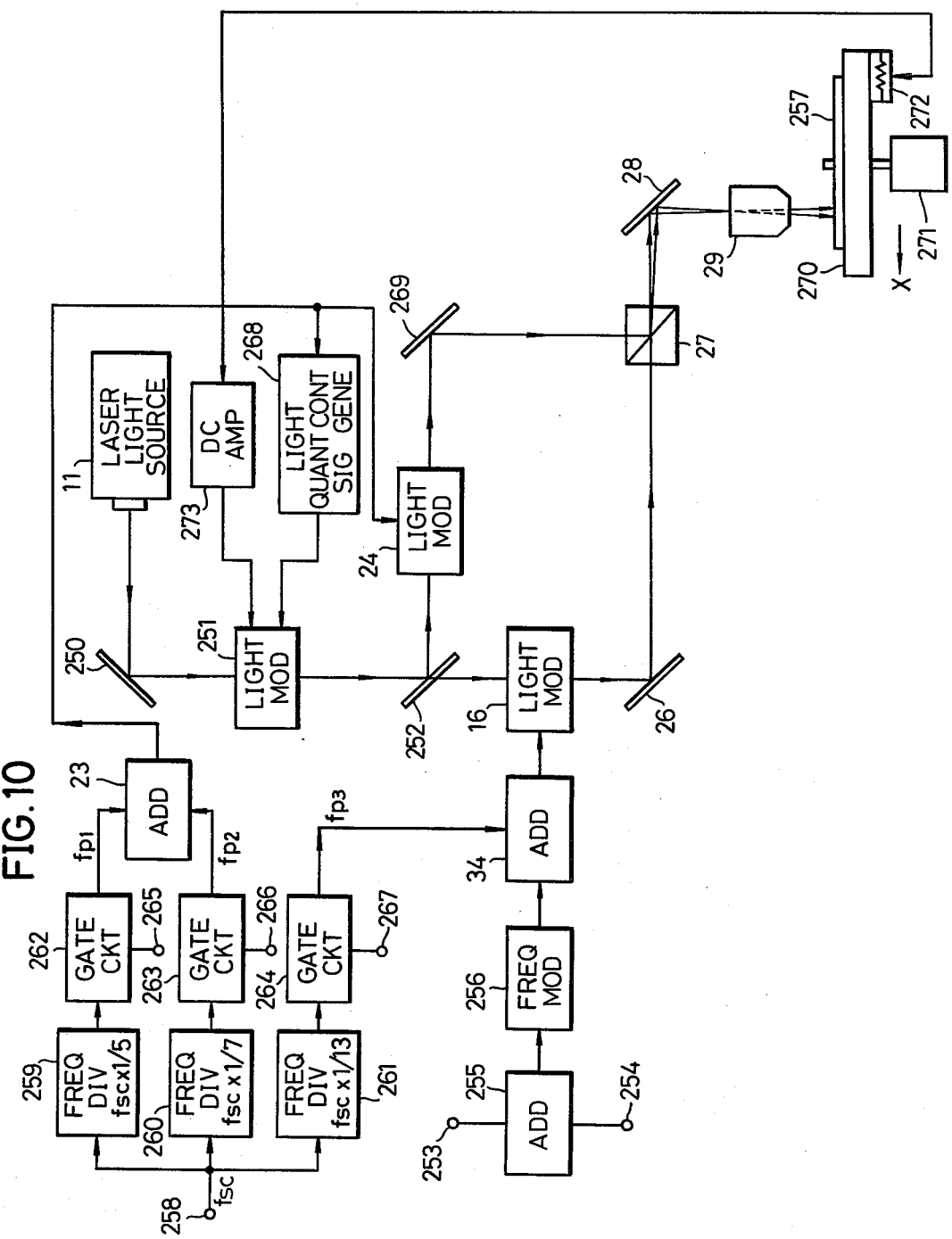
FIG. 10 is a block diagram showing a second embodiment of a recording system according to the present invention.

Referring next to FIG. 10 showing the second embodiment of the recording system according to the present invention, a laser light beam emitted from a laser light source 11 is reflected by a mirror 250 and passed through a light modulator 251 for light quantity adjustment. The light beam thus adjusted is projected onto a half mirror 252, which transmits one part of the light to a light modulator 16 and reflects another part thereof to another light modulator 24.

Information signals such as, for example, a color video signal and a frequency modulated audio signal to be recorded are supplied respectively through input terminals 253 and 254 to an adder 255. The added output of this adder 255 is supplied to a frequency modulator 256 to frequency modulate a carrier wave. The resulting output, frequency-modulated signal is added with the reference signal fp3 at the adder 34 as described hereinafter and is supplied as a main information signal to the above mentioned light modulator 16 to modulate the light beam transmitted through the half mirror 252. The frequency-modulated signal has a carrier wave center frequency of 7.0 MHz and has a frequency deviation width of 2.2 MHz. The resulting output is projected as a first modulated light beam onto a mirror 26, by which it is reflected, and is passed through a polarizing prism 27. The light thus transmitted through the prism 27 is reflected by a mirror 28, passes through an objective lens 29, and is brought to a focus on a photosensitive agent applied as a coating on a recirding original disc 257 made of material such as glass.

On the other hand, a signal of 3.58 MHz which synchronizes with a color subcarrier of the color video signal is applied to an input terminal 258. This signal is frequency divided by 1/5 and 1/7, for example, at frequency dividers 259 and 260, respectively, and thus rendered respectively into reference signals (hereinafter reffered to as pilot signals) for tracking control of a frequency fp1 (of 716 KHz) and a frequency fp2 (of 511 KHz). The signal from the terminal 258 is frequency divided by 1/13 into a pilot signal of frequency fp3 (of 275 KHz) at the divider 261. The output signals fp1, fp2, and fp3 of the dividers 259, 260, and 261 are respectively supplied to gate circuits 262, 263, and 264. The gate circuits 262 through 264 are respectively controlled of their gate operations responsive the gate signals supplied to terminals 265, 266, and 267. The gate signals supplied to the terminals 265 through 267 are obtained by circuits similar to the circuits for obtaining the gate signals to be supplied to the terminals 17 through 19 as indicated in FIG. 1A. The signal fp1 is derived from the gate circuit 262 during each horizontal blanking interval in two frame interval every other two frame periods of the recording video signal. The signal fp2 is derived from the gate circuit 263 during each horizontal blanking interval in two frame interval every the other two frame periods. The output signals of the gate circuit 262 and 263 are supplied to the mixer 23 where they are mixed each other. From the mixer 23 are thus derived the first and second reference signals fp1 and fp2 which exist respectively during every horizontal blanking interval in the two frame interval alternately every other two frame periods.

Figure 11:
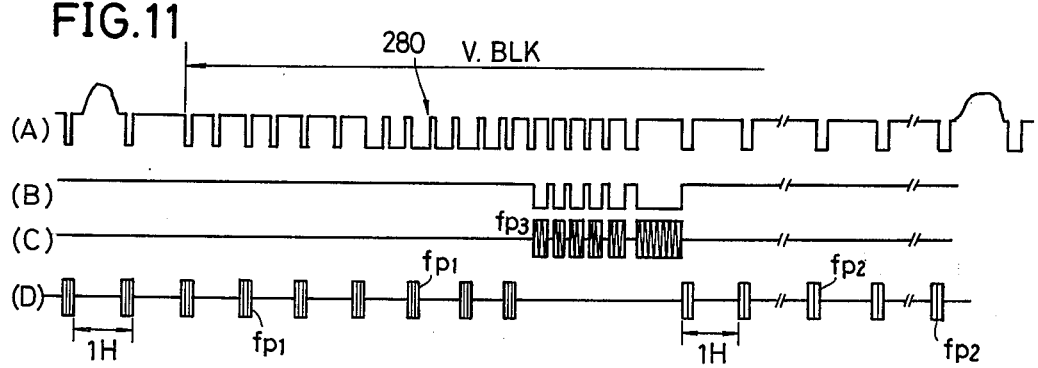
FIG. 11(A) through FIG. 11(D) are signal waveform diagrams respectively for explaining the operation of the system in the block diagram shown in FIG. 10.

A gate pulse which exists in the vertical blanking interval with two frame periods as indicated in FIG. 11(B) is applied to the gate circuit 264 from the terminal 267. This gate pulse exists in an interval corresponding to the equalizing pulses immediately after the vertical synchronizing signal 280 in the vertical blanking period V. BLK as indicated in FIG. 11(A). Accordingly, the third reference signal fp3, which exists in the vertical blanking period and has two frame period as indicated in FIG. 11(C), is derived from the gate circuit 264 and supplied to the adder 34. The third reference signal fp3 is added to the main information signal from the frequency modulator 256 thereby being supplied to the light modulator 16.

The reference signals fp1 and fp2 from the mixer 23 are supplied to the light modulator 24. The light beam reflected by the aforementioned half mirror 25 is modulated in the light modulator 24 by the above mentioned pilot signals, and the resulting output is reflected as a second modulated light beam by a mirror 269, thus being introduced into the polarizing prism 27, where its polarization plane is angularly shifted by 90 degrees from that of the above mentioned first modulated light beam. The second modulated light beam leaving the polarizing prism, together with the first modulated light beam, is reflected by the mirror 28, passes through the objective lens 29, and is focused on the recording original disc 257.

The original disc 257, which is mounted on a turntable 270, is rotated at a rotational speed of, for example 900 rpm.; by a motor 271. The original disc 257, turntable 270, and motor 271 are unitarily and continuously transported at a specific pitch in the arrow direction X by a transporting mechanism (not shown). As a result, the aforementioned main information signal and the pilot signals are recorded along a spiral track on the original disc from its outer periphery toward its central part respectively by the first and second modulated light beams.

Furthermore, a displacement position detector 272 comprising a potentiometer is provided to detect the displacement position due to the above described transporting movement as the original disc 257 and the turntable 270 are transported in the above mentioned arrow direction X and to produce as output a DC voltage responsive to the displacement position. This detected DC voltage is passed through a DC amplifier 273 and applied to the aforementioned light modulator 251 for light quantity adjustment thereby to control the intensity of the light beam from the laser light source 11 in responsive accordance with the position in the radial direction of the original disc 257 of the light beam spot focused on the disc 257. By this arrangement and operation of the recording apparatus, compensation is provided so as to eliminate the effect of difference in relative linear speed due to the position of the light beam spot in the radial direction of the original disc 257.

The reference signals fp1 and fp2 from the mixer 23 are supplied to a light quantity control signal generator 268 from which a light quantity control signal is supplied to the light modulator 251. The intensity of the light beam from the light source 11 is controlled at the light modulator 251 so that the light intensity is weakened during existing intervals of the reference signals fp1 and fp2. As a result, even during the interval when the reference signals fp1 and fp2 are applied on the original disc 257 as the second light modulated light beam, uniform light application on the original disc 257 is therefore attained.

Figure 12:
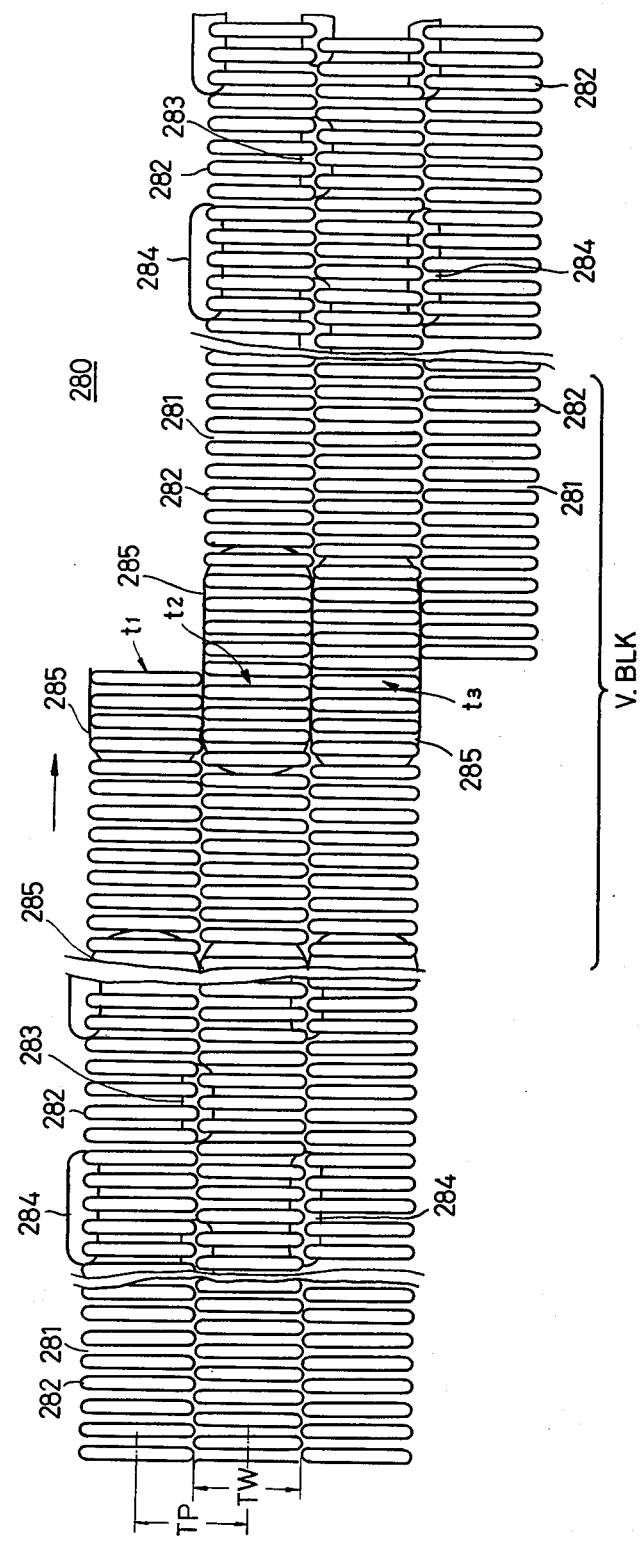
FIG. 12 is an enlarged view of a track pattern recorded and formed in accordance with the recording system shown in FIG. 10.

The embodiment of the disc according to the invention obtained by recording by means of the recording system illustrated in FIG. 10 and described above will now be described with reference to FIG. 12. A surface 281 of those parts of a disc 280 in which pits are not formed are planar and are not provided with a guide groove. Pits 282 are formed in the disc 280 in responsive accordance with the above mentioned main information signal. Only one part of the main information signal track turns t1, t2, and t3 comprising each of successions of pits 282 is shown. The tracks t1, t2, t3, . . . are those of a single spiral track and are respectively parts corresponding to revolutions of the disc 280. In the present embodiment of the invention, an information signal of four fields of a video signal are recorded along the track.

In the present embodiment of the invention, the pits are so formed that one of the edge lines of each track is substantially coincident with the nearest edge line of the adjacent track. That is, the adjacent track t1, t2, t3, . . . are so formed that they are successively contiguous. Accordingly, the track pitch TP is substantially equal to the track width TW.

At central positions (coinciding with the edge lines of the tracks in the present embodiment of the invention) approximately intermediate between the centerlines t1c and t2c, t2c and t3c, . . . of the mutually adjacent tracks t1 and t2, t2 and t3, . . . , pilot signal pits 283 and 284 responsively corresponding to the aforementioned pilot signals of the frequencies fp1 and fp2 are formed.

The third reference signal fp3 is recorded, with pits 285 having width same to the width of the pits 282 (track width) of the information signal track, at the predetermined position in the vertical blanking interval V. BLK on the respective tracks t1, t2, t3, . . . . Since the third reference signal fp3 is thus recorded in a state where it is superimposed on the information signal, the signal fp3 can be stably and accurately reproduced, even though the tracing stylus deviates a little from the center line of the track.

Figure 13:
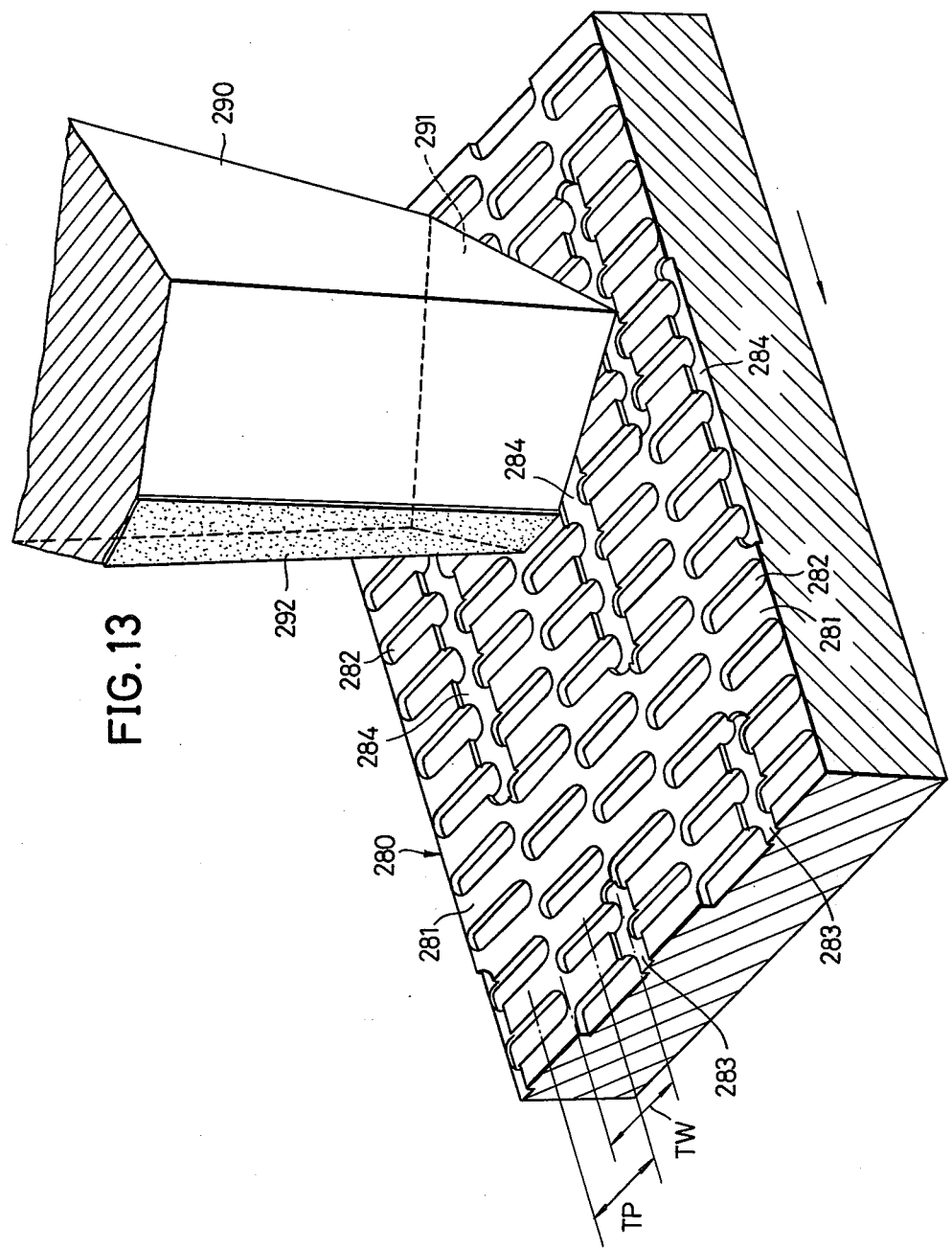
FIG. 13 is an enlarged perspective view showing a tracing state of the reproducing stylus on the recording disc.

The state of a tracing stylus 290 which traces the recorded track of the disc 280 having the above described pit arrangement is indicated in FIG. 13, in which only a bottom face 291 of the stylus 290 and the bottom face of an electrode 292 are shown. The bottom face 291 of the stylus has a part of maximum width SW, which is greater than the track pitch TP of the disc 280, and an electrode 292 having a thickness of 500–3000 Å is fixed to the rear face of the stylus at the rear edge of the bottom face 291. As the disc 280 rotates in the arrow direction, the tracing stylus 290 traces relatively along the surface of the disc 280, the electrostatic capacitance between the electrode 292 and an electroconductive layer covering the entire surface of the disc varies in response to the pits 282, whereby the main information signal recorded by the pits 282 is reproduced.

At the same time, the pilot signals of frequencies fp1 and fp2 recorded by the pits 283 and 284 are also reproduced by the electrode 292. In the case where the center of the electrode 292 deviates from the centerline of the track, a level difference occurs in the reproduced pilot signals, and tracking servo operation is carried out.

Figure 14:
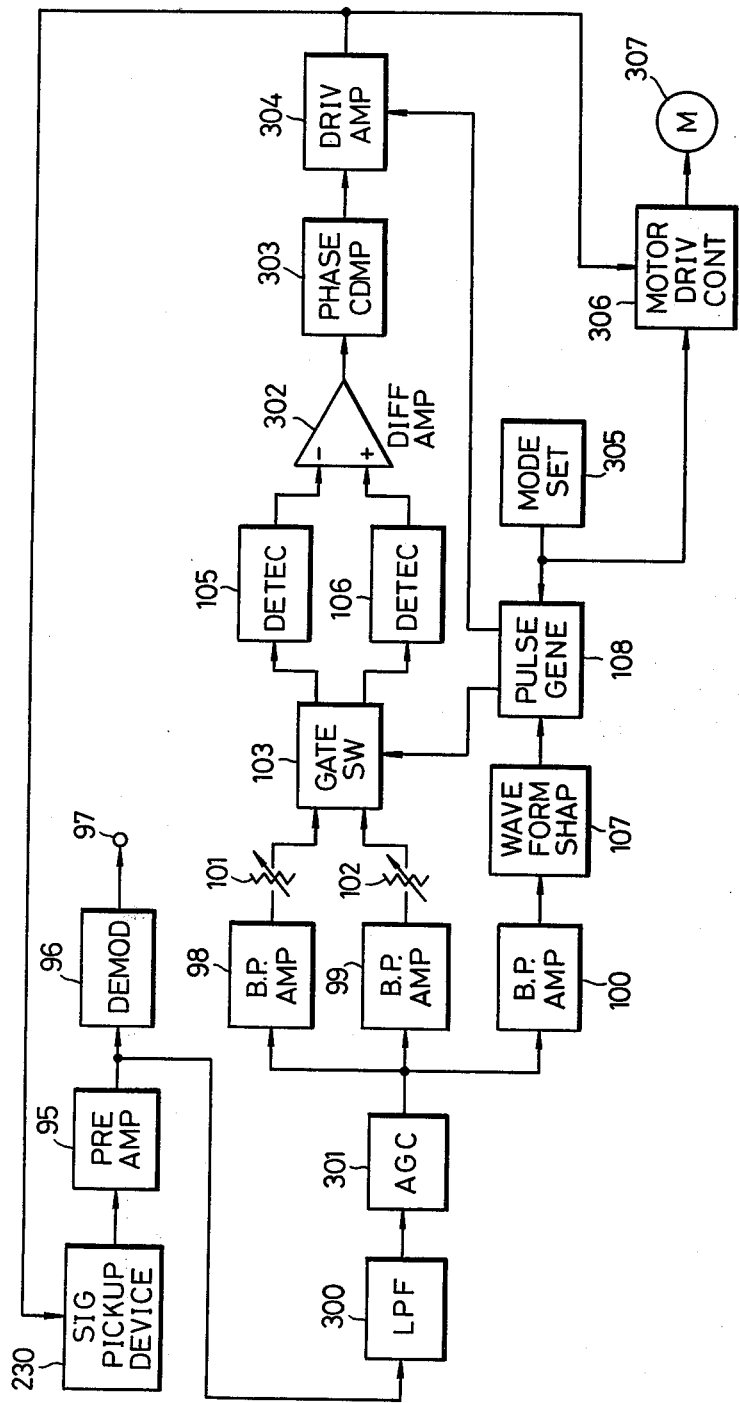
FIG. 14 is a block diagram showing a second embodiment of a reproducing system according to the present invention.

The second embodiment of the reproducing system is described with reference to FIG. 14. In FIG. 14, those parts which are the same as corresponding parts in FIG. 8 are designated by like reference numerals. Detailed description of such parts will not be repeated.

In the system shown in FIG. 14, a reproduced signal picked up from the disc by the tracing stylus of the signal pickup device 230 is supplied through the preamplifier 95 to the demodulator 52 and a low-pass filter 300.

The output reference signals fp1, fp2, and fp3 from the low-pass filter 300 pass through an automatic gain control circuit 301 and are supplied respectively to amplifiers 98 through 100.

The gate switching circuit 103 switches the signals fp1 and fp2 every revolution period of the disc in response to the switching pulses supplied from the pulse generating circuit 108, and supplies the switched signals fp1 and fp2 of respectively predetermined poralities to detecting circuits 65 and 66.

The detecting circuits 105 and 106 detect the envelopes of their respective input reference signals and convert the envelopes into DC voltages. These voltages are then supplied to a differential amplifier 302. This differential amplifier 302 compares the output signals of the two detecting circuit 105 and 106 which vary in response to the reproduced levels of the signals fp1 and fp2. This generates an output tracking error signal which indicates the tracking error direction and the error quantity. This error signal passes through a phase compensation circuit 303 and is further amplified to a specific level by a driving amplifier 304.

Then, the output signal of the driving amplifier 304 is applied to the signal pickup device 230 as a control signal thereby to control it. As a result, the tracing stylus is tracking controlled so that the above mentioned tracking error signal becomes zero, that is, so that the stylus traces correctly the track of the disc. Furthermore, the output signal of the driving amplifier 304 is supplied also to a motor driving control circuit 306 and so controls the rotational driving of a motor 307, which moves the signal pickup device 230, that the tracking control is carried out with the cantilever of the signal pickup device 230 constantly in the state wherein it is in its neutral position.

The pulse generating circuit 108 operates in response to the reproducing mode set by a control part 305 for setting the special reproducing mode such as slow, still, or fast reproducing mode to generate switching pulses and skip pulses, which are respectively supplied to the gate switching circuit 103 and the driving amplifier 304.

The embodiments set forth are described for reproducing the disc 71 or 280 recorded in a pit pattern by means of an electrostatic tracing stylus 74 or 290. The reproducing tracing means is not limited to the tracing stylus type, but the laser beam, for instance, may be used.

Further, this invention is not limited to these embodiments but various variations and modifications may be made without departing from the scope of the invention.

What is claimed is:

1. An information signal recording system comprising:

means for rotating a recording disc;
   means for producing two light beams;
   means for producing and sequentially switching first and second reference signals which have different frequencies, such that said reference signals correspond to each rotating period of the recording disc, and means for further producing a third reference signal which has a frequency that is different from the frequencies of the first and second reference signals, said third signal being produced responsive to said switching of the first and second reference signals;
   means for adding said third reference signal and an information signal which are to be recorded;
   a first light modulating means for modulating one of said two light beams with the output signal of said adding means;
   a second light modulating means for modulating the other of said two light beams responsive to the first and second reference signals; and
   recording means for simultaneously forming an information signal track on the recording disc responsive to the light beam modulated by the first light modulating means and a reference signal track on an intermediate part of said recording disc between center lines of adjacent information signal tracks, said recorded signals being responsive to the light beam modulated by the second light modulating means,
   said first and second reference signals being alternately recorded on the reference signal track each rotating period of the recording disc, said third reference signal being recorded at a predetermined position on the information signal track each rotating period of the recording disc.

2. The recording system of claim 1 wherein said information signal is a video signal, and said means for producing said third reference signal produces said third reference signal during intervals corresponding to vertical blanking period of the video signal, and said third reference signal is recorded at a corresponding position in each rotational period of the recording disc.

* * * * *